Oct. 8, 1957  R. E. HALVARSON  2,809,008
STRAP TIGHTENER
Filed July 30, 1954
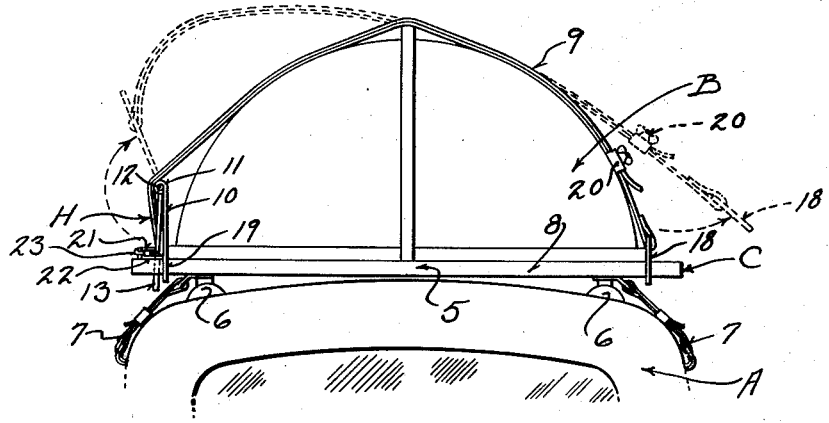
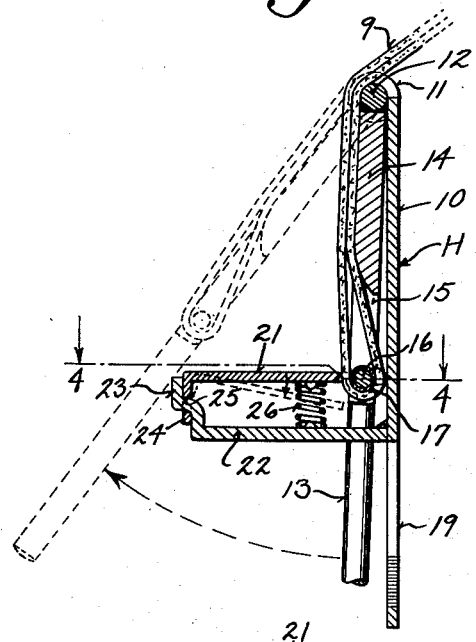
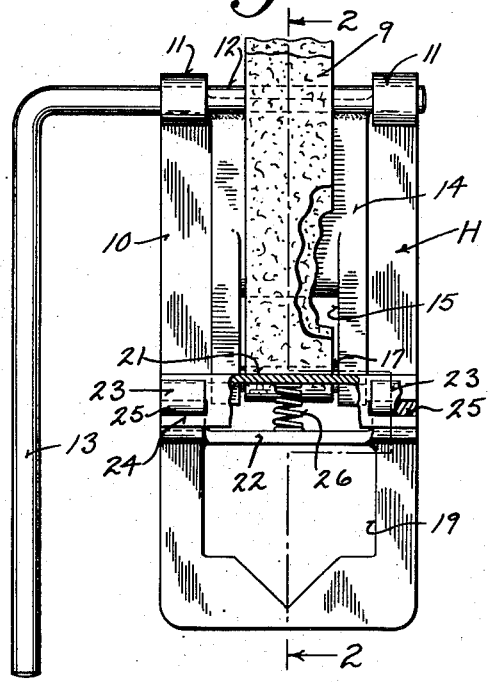
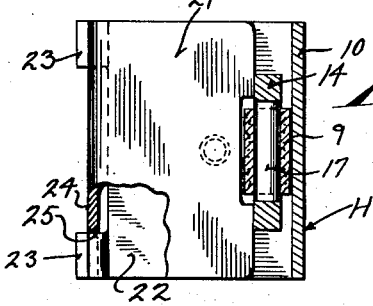
INVENTOR
RALPH E. HALVARSON
BY
*Young Wright*
ATTORNEYS

United States Patent Office 2,809,008
Patented Oct. 8, 1957

2,809,008

STRAP TIGHTENER

Ralph E. Halvarson, Milwaukee, Wis.

Application July 30, 1954, Serial No. 446,800

2 Claims. (Cl. 248—362)

This invention appertains to take-up devices, strap tighteners and the like, and more particularly to a device especially adapted for, but not necessarily limited to, taking up slack in straps for firmly holding boats in place on carriers.

In boat carriers for automobiles, a frame is secured to the top of the automobile and this frame usually embodies transversely extending rest and supporting bars for the boat. Straps or webs having loops at their terminals are placed over the boat with the loops receiving the ends of the supporting bars. The straps are usually tightened by buckles and due to the length of the straps and the position thereof on top of an automobile much difficulty is experienced in pulling up on the straps tight around the boat and then holding the straps in their tightened adjusted position by the buckles.

It is, therefore, one of the primary objects of my invention to provide a device for tightening straps and the like around articles, such as boats, embodying means for initially and permanently adjusting the straps to the approximate size of the article, and then firmly tightening the straps in close gripping contact with the article by the mere manipulation of a hand lever.

Another salient object of my invention is the provision of a boat carrier for automobiles embodying a novel device for the holding straps of the boat which can be easily and instantly manipulated for tightening and loosening the straps from the side of an automobile.

A further important object of my invention is the provision of a strap or line tightener and holder embodying a frame having rockably mounted thereon a lever plate with means at its outer end for receiving the strap or line, and a hand lever or crank for turning the lever plate to a lowered, tightened position, and a spring pressed finger actuated latch for releasably holding the lever plate in its lowered strap tightened position, the frame having means for detachably engaging a boat carrier or for receiving the other end of the strap according to the use of the device.

A still further important object of my invention is to provide a device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed and illustrated in the accompanying drawing, in which drawing, Figure 1 is a fragmentary and elevational view showing a boat carrier on top of an automobile with my improved device incorporated therewith, the strap being shown in its tightened gripping position in full lines and in its released loose position in dotted lines;

Figure 2 is a vertical central sectional view through my strap tightener and holder, the section being taken on the line 2—2 of Figure 3, looking in the direction of the arrows, the view being taken on a larger scale than Figure 1, the lever plate being shown in full lines in its lowered locked position and in dotted lines in its released loosened position;

Figure 3 is a front elevational view of my improved tightener with parts thereof broken away and in section to illustrate structural detail, and Figure 4 is a horizontal sectional view taken through the strap tightening device and holder, the view being taken on the line 4—4 of Figure 2, looking in the direction of the arrows.

Referring to the drawing in detail, wherein similar reference characters designate corresponding parts throughout the several views, the letter C generally indicates a carrier for a boat B adapted to be attached to the top of an automobile A.

The carrier C, per se, forms no part of the present invention, and can be of any type now found in the open market, and hence this carrier will not be described in minute detail; however, the same includes a frame 5 attached to the roof of the automobile A by means of suction cups 6 and straps 7. The frame itself includes transversely extending cross-bars 8. The cross-bars have associated therewith straps 9 for encircling the boat B to hold the same in place. Each strap 9 has associated therewith my novel strap tightener and holder H. While I have shown the strap tightener and holder H incorporated with a boat carrier it is to be understood that the tightener and holder has many uses, and is not limited to boat carriers.

My strap holder and tightener H embodies a frame plate 10 and this plate at its upper corners is rolled to provide hinge barrels 11 for rotatably receiving a horizontally disposed shaft 12. One end of the shaft has formed thereon a right angularly extending manipulating hand crank or lever 13. Welded or otherwise rigidly secured to the shaft 12 for movement therewith and between the barrels 11 is a lever plate 14. The lower end of this plate is notched, as at 15, and extending across the open end of the notch is a pin 16. This pin 16 can have mounted thereon for free turning movement and anti-friction sleeve 17. Now in accordance with my invention one end of the stray carries a loop 18 adapted to be slid over one end of a cross-bar 8. The device itself has associated therewith a similar loop 19 for fitting over the opposite end of the same cross-bar. As shown in the drawing, this loop 19 is formed directly on the plate 10 as an extension thereof and the walls of the loop are preferably shaped to either receive cross-bars of a rectangular shape in cross-section or cross-bars of a round shape in cross-section. The strap remote from the loop 18 is threaded through the notch or slot 15 under the pin 16 and is then brought back over the boat. During the initial placing of a boat in position on the carrier the hand crank 13 is moved to a raised position and carries therewith the lever plate 14 (see dotted lines, Fig. 1), the strap is pulled around the pin 16 to an approximate desired tight position and the free end of the strap is then permanently clamped to an intermediate portion of the strap by means of any desired type of clamp 20. Where the carrier is to be used for the same boat, further adjustment of the length of the strap by means of the clamp 20 is unnecessary. To tighten the strap in intimate gripping contact with the boat, the hand crank or lever 13 is swung down to a complete lowered position with the lever plate against or in close proximity to the frame plate 10. This will effectively tighten the strap around the boat and obviously, to remove the boat it is merely necessary to swing up on the lever and remove the loops 18 and 19 from the bar 8.

It is necessary and desirable to hold the lever plate in its lowered strap tightening position against accidental movement and to accomplish this, I employ a latch plate 21. This latch plate can be associated with the frame plate 10 in various manners, and as illustrated in the example shown in the drawing, the frame plate 10 has rigidly secured thereto an outwardly extending substantially horizontally disposed base plate 22. The latch plate 21 is hingedly connected at its outer end in any desired way to the base plate 22. As shown, the outer corners of the base plate 22 have formed thereon outwardly bent and then upstanding pivot ears 23. The outer edge of the latch plate 21 has formed thereon a depending right angularly extending flange 24 and the outer ends of the flange are slotted, as at 25, to receive the ears 23. The arrangement of the flange 24 and the ears 23 is such, that upward swinging movement of the latch plate beyond a predetermined point is prevented. The plate 21 is disposed above the base plate 22 and is normally held in its raised position by a spring 26. The inner edge of the latch plate 21 is spaced from the frame plate 10 and normally lies above the lower edge of the lever plate 14. When the lever plate is swung down to its lowered position, the same will engage the top surface of the latch plate and depress the latch plate against tension of the spring 26. As the lever plate 14 and the strap pass the latch plate 21, the latch plate will automatically rise and lie in front of the lever plate 14 and effectively prevent outward swinging movement thereof. When it is desired to release the strap, it is merely necessary to press down on the latch plate 21 with the fingers and the lever plate 14 will automatically swing upward on the pull of the strap.

From the foregoing description, it can be seen that I have provided a novel and simple strap tightener of an exceptionally durable construction.

Various changes in details may be made without departing from the spirit or the scope of my invention, but what I claim as new is:

1. In a boat carrier of the type embodying transversely extending rest and supporting bars, a strap having a loop at one end for engaging over one terminal of a supporting bar, a strap tightener and holder comprising a frame plate having associated therewith a loop for detachably receiving the open end of a supporting bar, a shaft rockably carried by the upper end of the frame plate, a lever plate secured to and movable with the shaft for movement toward and away from the frame plate, said lever plate having a notch at its outer end and a pin extending across the notch, the strap being threaded through the notch and around the pin, means securing the strap in an initial adjusted position, a hand crank for turning the shaft and for moving the lever plate toward the frame plate and with the strap in a final adjusted taut position, an outwardly projecting base plate on the frame plate, a latch plate hingedly secured to the outer end of the base plate projecting toward the frame plate but terminating short thereof, means holding the latch plate in a raised position, and means limiting upward position of the latch plate, said latch plate in its raised position normally lying in front of the lever plate and above the lower edge thereof when the lever plate is in its lowered position for holding the lever plate against outward and upward swinging movement.

2. In a boat carrier of the type embodying transversely extending rest and supporting bars, a strap having a loop at one end for engaging over one terminal of a supporting bar, a strap tightener and holder comprising a frame plate having associated therewith a loop for detachably receiving the open end of a supporting bar, a shaft rockably carried by the upper end of the frame plate, a lever plate secured to and movable with the shaft for movement toward and away from the frame plate, said lever plate having a notch at its outer end and a pin extending across the notch, the strap being threaded through the notch and around the pin, means securing the strap in an initial adjusted position, a hand crank for turning the shaft and for moving the lever plate toward the frame plate and with the strap in a final adjusted taut position, an outwardly projecting base plate on the frame plate, a latch plate hingedly secured to the outer end of the base plate projecting toward the frame plate but terminating short thereof, means limiting upward position of the latch plate, and a spring between said latch plate and said frame plate continually urging said latch plate to its raised position, said latch plate in its raised position normally lying in front of the lever plate and above the lower edge thereof when the lever plate is in its lowered position for holding the lever plate against outward and upward swinging movement.

References Cited in the file of this patent

UNITED STATES PATENTS

| 511,350 | Mohring | Dec. 26, 1893 |
| 693,079 | Stoneman | Feb. 11, 1902 |

FOREIGN PATENTS

| 283,621 | Great Britain | Jan. 9, 1928 |